United States Patent
Bates et al.

(10) Patent No.: US 11,689,486 B1
(45) Date of Patent: Jun. 27, 2023

(54) TOPIC OVERLAP DETECTION IN MESSAGING SYSTEMS

(71) Applicant: Microsoft Technology Licensing, LLC, Redmond, WA (US)

(72) Inventors: Jonathan Ray Bates, Bellevue, WA (US); Shoou-Jiun Wang, Sammamish, WA (US); Jaclyn Ruth Elizabeth Phillips, Vancouver (CA); Tracy My Tuyen Nguyen, Renton, WA (US); Yi Zhang, Kirkland, WA (US); Thinesh Thangakumar Abimanyu Rathinavelu, Redmond, WA (US); Jennifer Olivia Ede, Everett, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/744,241

(22) Filed: May 13, 2022

Related U.S. Application Data

(60) Provisional application No. 63/315,741, filed on Mar. 2, 2022.

(51) Int. Cl.
*H04L 51/21* (2022.01)
*H04L 51/02* (2022.01)
(Continued)

(52) U.S. Cl.
CPC .............. *H04L 51/21* (2022.05); *G06F 18/22* (2023.01); *G06F 40/237* (2020.01); *G06F 40/35* (2020.01); *H04L 51/02* (2013.01)

(58) Field of Classification Search
None
See application file for complete search history.

(56) References Cited

U.S. PATENT DOCUMENTS 8,630,961 B2 * 1/2014 Beilby ................... G06N 3/004
706/11
9,275,038 B2 * 3/2016 Bierner ................. G06F 40/289
(Continued)

FOREIGN PATENT DOCUMENTS

CN    110192246 A    8/2019
CN    111557002 A    8/2020
(Continued)

OTHER PUBLICATIONS

Zhang, Jeff, "AI-Assisted Authoring: Detect Topic Overlaps and Get Topic Suggestions from Bot Sessions", Retrieved from: https://powervirtualagents.microsoft.com/en-us/blog/ai-assisted-authoring-detect-topic-overlaps-and-get-topic-suggestions-from-bot-sessions/, Jun. 22, 2021, 4 Pages.
(Continued)

*Primary Examiner* — Backhean Tiv
(74) *Attorney, Agent, or Firm* — Weaver IP L.L.C.

(57) ABSTRACT

Embodiments are provided for detecting overlapping topics in a messaging system. In an example system, a plurality of trigger phrases is received, where each trigger phrase is configured to trigger a bot that receives the trigger phrase to select a corresponding topic for conversation. For each trigger phrase, a vector representation is generated. Measures of similarity are generated based at least on the vector representations, where each measure of similarity represents a degree of similarity between a respective pair of vector representations. A topic overlap is detected based on a pair of vector representations having a measure of similarity above a similarity threshold, where the topic overlap indicates two trigger phrases that are overlapping. The topic overlap is provided to an authoring tool that comprises one or more interactive elements to enable a user to change at least one of the two trigger phrases that are overlapping.

20 Claims, 7 Drawing Sheets

(51) Int. Cl.
   *G06F 40/35*    (2020.01)
   *G06F 40/237*   (2020.01)
   *G06F 18/22*    (2023.01)

(56) References Cited

U.S. PATENT DOCUMENTS

| | | | |
|---|---|---|---|
| 9,710,539 B2* | 7/2017 | Dey | H04L 51/216 |
| 10,366,168 B2* | 7/2019 | Wu | G06N 7/01 |
| 10,498,898 B2* | 12/2019 | Mazza | G06F 16/3329 |
| 10,659,403 B2* | 5/2020 | Smullen | H04L 51/02 |
| 10,698,654 B2* | 6/2020 | Loughrey | G10L 15/19 |
| 10,708,216 B1* | 7/2020 | Rao | H04L 51/52 |
| 10,848,443 B2* | 11/2020 | Helmy | G06N 5/041 |
| 10,861,022 B2* | 12/2020 | Gupta | G06F 40/166 |
| 10,949,454 B2* | 3/2021 | Conley | G06N 3/044 |
| 10,951,555 B2* | 3/2021 | Wu | G06N 7/01 |
| 10,958,779 B1* | 3/2021 | Rule | H04M 3/54 |
| 10,976,904 B2* | 4/2021 | Moran | G06F 3/04842 |
| 10,991,361 B2* | 4/2021 | Kwatra | G10L 15/075 |
| 10,992,604 B1* | 4/2021 | Knas | H04L 51/04 |
| 11,030,412 B2* | 6/2021 | Shanmugam | G06F 16/951 |
| 11,074,415 B2* | 7/2021 | Silverstein | H04L 51/02 |
| 11,074,907 B1* | 7/2021 | Mallikarjuniah | G10L 15/1815 |
| 11,113,475 B2* | 9/2021 | Sampat | G06F 40/35 |
| 11,128,579 B2* | 9/2021 | Magliozzi | H04L 51/066 |
| 11,146,509 B2* | 10/2021 | Chen | H04L 51/04 |
| 11,153,234 B2* | 10/2021 | Wu | G06F 16/9535 |
| 11,157,490 B2* | 10/2021 | Zhu | G06F 16/243 |
| 11,159,457 B2* | 10/2021 | Liang | G06F 40/279 |
| 11,176,466 B2* | 11/2021 | Neogi | G06N 5/022 |
| 11,184,298 B2* | 11/2021 | Freed | G06F 18/23 |
| 11,188,720 B2 | 11/2021 | Croutwater et al. | |
| 11,190,469 B2* | 11/2021 | Erhart | G06F 40/30 |
| 11,200,506 B2* | 12/2021 | Wu | G06F 40/30 |
| 11,205,422 B2* | 12/2021 | Kwatra | G10L 25/24 |
| 11,212,241 B1* | 12/2021 | Pace, Jr. | G06Q 40/02 |
| 11,226,997 B2* | 1/2022 | Pinel | G06N 3/006 |
| 11,227,342 B2 | 1/2022 | Wu et al. | |
| 11,243,991 B2* | 2/2022 | Fincun | H04L 51/02 |
| 11,250,216 B2* | 2/2022 | Demme | G06Q 20/40145 |
| 11,263,249 B2* | 3/2022 | Layton | G06N 3/006 |
| 11,288,566 B2* | 3/2022 | Liu | H04L 12/1813 |
| 11,301,916 B1* | 4/2022 | Hayes | H04L 51/02 |
| 11,397,762 B2* | 7/2022 | Raval Contractor | G06F 40/20 |
| 11,416,682 B2* | 8/2022 | Patel | G06F 40/295 |
| 11,423,066 B2* | 8/2022 | Ganu | G06F 16/3329 |
| 11,435,980 B2* | 9/2022 | Byun | G10L 15/22 |
| 11,487,948 B2* | 11/2022 | Kaur | G06F 40/289 |
| 11,501,211 B2* | 11/2022 | Wu | G06N 20/00 |
| 11,514,330 B2* | 11/2022 | Ma | G06F 40/30 |
| 11,516,153 B2* | 11/2022 | Barrett | H04L 51/046 |
| 11,552,909 B2* | 1/2023 | Lopes de Moraes | G06F 11/3692 |
| 2014/0279050 A1* | 9/2014 | Makar | G06F 16/9535 705/14.66 |
| 2017/0213130 A1 | 7/2017 | Khatri et al. | |
| 2018/0189273 A1* | 7/2018 | Campos | H04L 51/02 |
| 2019/0068527 A1* | 2/2019 | Chen | G06F 40/216 |
| 2019/0199658 A1* | 6/2019 | Kim | H04L 51/02 |
| 2019/0260694 A1* | 8/2019 | Londhe | H04L 51/216 |
| 2019/0354557 A1* | 11/2019 | Kornblit | H04L 51/04 |
| 2020/0137001 A1* | 4/2020 | Wu | G06F 40/216 |
| 2021/0092078 A1* | 3/2021 | Lee | G06F 40/35 |
| 2021/0203623 A1* | 7/2021 | Zhou | G06F 16/3329 |
| 2021/0209441 A1* | 7/2021 | Sivakumar | G06N 5/013 |
| 2021/0295203 A1* | 9/2021 | Liao | G06F 40/30 |
| 2021/0406473 A1* | 12/2021 | Park | H04L 51/02 |
| 2022/0075947 A1 | 3/2022 | Swvigaradoss et al. | |
| 2022/0076283 A1* | 3/2022 | Oliveira | G06Q 10/0637 |
| 2022/0374604 A1* | 11/2022 | Sivakumar | G06N 20/00 |
| 2023/0004718 A1* | 1/2023 | Helvik | H04L 51/02 |

FOREIGN PATENT DOCUMENTS

| | | |
|---|---|---|
| EP | 3776175 A1 | 2/2021 |
| IN | 202041028027 A | 1/2020 |

OTHER PUBLICATIONS

Batir, Sean, "How to Make a Simple Chatbot", Retrieved from: https://towardsdatascience.com/how-to-make-a-simple-chatbot-841b5efa2094, Jul. 7, 2020, 12 pages.

* cited by examiner

FIG. 6

Power Virtual Agents (Bot Name)

- Home
- Topics
- Entities
- Analytics
- Publish
- Manage
- Details
- Channels
- Security
- Skills Test your bot Analytics
Updated about one hour ago Summary | Topic Triggering | Customer Satisfaction | Sessions | Billing

Overlapping Topics Found — 602

Trigger phrases that are too similar blur the boundaries between topics. To improve triggering, review overlapping topics and trigger phrases. Learn more.

| Similarity ↑ | Topics (30) | Overlaps |
|---|---|---|
| 99 | Cancel subscription | 3 |
| 95 | Store locator | 20 |
| 93 | Account set up | 2 |
| 92 | Gift cards | 3 |
| 91 | Pause subscription | 1 |
| 90 | Returns | 1 |

Power Virtual Agents (Bot Name)

- Home
- Topics
- Entities
- Analytics
- Publish
- Manage
- Details
- Channels
- Security
- Skills Test your bot Analytics
Updated about one hour ago Summary | Topic Triggering | Customer Satisfaction | Sessions

Overlapping Topics Found

Trigger phrases that are too similar blur the boundaries between topics. To improve triggering, review overlapping topics and trigger phrases. Learn more.

| Similarity ↑ | Topics (30) | Overlaps |
|---|---|---|
| 99 | Cancel subscription | 3 |
| 95 | Store locator | 20 |
| 93 | Account set up | 2 |
| 92 | Gift cards | 3 |
| 91 | Pause subscription | 1 |
| 90 | Returns | 1 |

Billing

Cancel subscription

Topic overlap details
Rewrite or remove trigger phrases to distinguish between topics. Learn more Overlapping trigger phrases (4)

- suspend subscription
  - ☐ Cancel subscription
- Stop paper subscription
  - ☐ Paper subscriptions
- cancel subscription renewal
  - ☐ Cancel subscription
- Stop subscription
  - ☐ Subscription management ↓ Download (.xls)   Save   Cancel

FIG. 7

TOPIC OVERLAP DETECTION IN MESSAGING SYSTEMS

CROSS-REFERENCE TO RELATED APPLICATIONS

This application claims priority to U.S. Provisional Patent Application No. 63/315,741, filed on Mar. 2, 2022, entitled "Topic Overlap Detection and Topic Suggestion Tools," the entirety of which is incorporated by reference herein.

BACKGROUND

Messaging systems, such as chat bots, may be utilized in a variety of contexts to simulate natural conversations with humans. In typical systems, a user query is parsed to identify a topic that best aligns with the query. Based on the identified topic, the chat bot provides a response to the user.

In existing systems, a user query may unintentionally align with multiple topics. For example, a user may input a phrase to a chat bot, but due to the functioning of the chat bot, several possible topics relating to the phrase are identified. These overlapping topics result in additional dialog between the user and the chat bot to determine an appropriate topic of interest.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for detecting overlapping topics in a messaging system. In an example system, a phrase representation generator is configured to receive a plurality of trigger phrases, where each trigger phrase is configured to trigger a bot that receives the trigger phrase to select a corresponding topic for conversation. The phrase representation generator is also configured to generate, for each trigger phrase, a vector representation. A topic overlap detector is configured to generate measures of similarity based at least on the vector representations, where each measure of similarity represents a degree of similarity between a respective pair of vector representations. The topic overlap detector detects a topic overlap based on a pair of vector representations having a measure of similarity above a similarity threshold, where the topic overlap indicates two trigger phrases that are overlapping. The topic overlap detector provides the topic overlap to an authoring tool that comprises one or more interactive elements to enable a user to change at least one of the two trigger phrases that are overlapping. In this manner, authors of bots (e.g., chat bots) may see and resolve overlapping topics, resulting in improved performance of the messaging system.

Further features and advantages of the disclosed subject matter, as well as the structure and operation of various example embodiments, are described in detail below with reference to the accompanying drawings. It is noted that the disclosed subject matter is not limited to the specific embodiments described herein. Such example embodiments are presented herein for illustrative purposes only. Additional example embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

FIG. 6 shows an illustrative user interface for presenting overlapping topic information, according to an example embodiment.

FIG. 7 shows an illustrative user interface for presenting overlapping topic information, according to an example embodiment.

Figure 1:
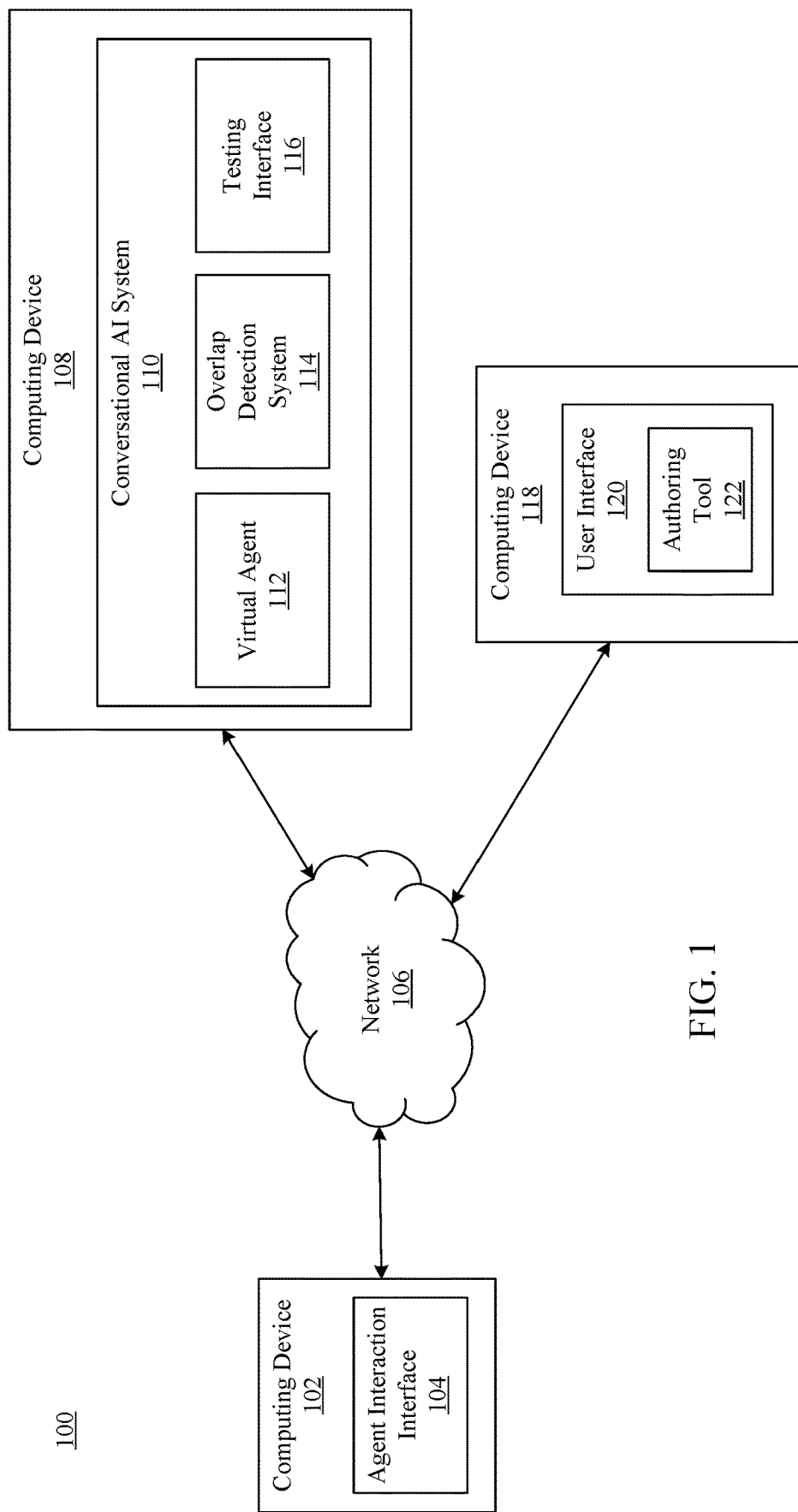
FIG. 1 shows a block diagram of a messaging system, according to an example embodiment.

The features and advantages of the disclosed subject matter will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more example embodiments that incorporate the features of the disclosed subject matter. The scope of the disclosed subject matter is not limited to the example embodiments described herein. The example embodiments merely exemplify the disclosed subject matter, and modified versions of the disclosed embodiments are also encompassed. Example embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, should be understood to mean that the condition or characteristic is defined to within tolerances that are acceptable for operation of the example embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous example embodiments are described as follows. It is noted that any section/subsection headings provided herein are not intended to be limiting. Example embodiments are described throughout this document, and any type of embodiment may be included under any section/subsection. Furthermore, example embodiments disclosed in any section/subsection may be combined with any other embodiments described in the same section/subsection and/or a different section/subsection in any manner.

II. Example Implementations

Messaging systems, such as chat bots, may be utilized in a variety of contexts to simulate natural conversations with humans. In typical systems, a topic is selected that corresponds to the user query. Based on the selected topic, the chat bot provides a response to the user.

In existing systems, a user query may unintentionally align with multiple topics. For example, a user may input a phrase to a chat bot, but due to the functioning of the chat bot, several possible topics relating to the phrase are identified. These overlapping topics result in additional dialog between the user and the chat bot to determine an appropriate topic of interest. For instance, a chat bot may need to ask a user one or more clarifying questions to identify an appropriate topic for the conversation, such as a question asking the user which topic the user is interested in (e.g., a "Did you mean" question). These overlapping topics therefore can result in poor overall performance and usability of the chat bot.

Embodiments described herein address these and other issues by providing methods, systems, apparatuses, and computer program products for detecting overlapping topics in a messaging system. In an example system, a phrase representation generator is configured to receive a plurality of trigger phrases, where each trigger phrase is configured to trigger a bot that receives the trigger phrase to select a corresponding topic for conversation. The phrase representation generator is also configured to generate, for each trigger phrase, a vector representation. A topic overlap detector is configured to generate measures of similarity based at least on the vector representations, where each measure of similarity represents a degree of similarity between a respective pair of vector representations. The topic overlap detector detects a topic overlap based on a pair of vector representations having a measure of similarity above a similarity threshold, where the topic overlap indicates two trigger phrases that are overlapping. The topic overlap detector provides the topic overlap to an authoring tool that comprises one or more interactive elements to enable a user to change at least one of the two trigger phrases that are overlapping. In this manner, authors of bots (e.g., chat bots) may see and resolve overlapping topics, resulting in improved performance of the messaging system. In other words, authors may use an authoring tool as described herein to further define boundaries between topics so that triggering of topics for conversation by a bot is more precise.

For instance, a messaging system may include a conversational artificial intelligence (AI) system in which a customer (e.g., an author or a citizen developer) can create, remove, or modify topics for conversation, where each topic may be defined by one or more trigger phrases. During a chat session between a user and conversational AI system, the system decides which of the defined topics best aligns with the user dialog. In an example system where topic authoring is open ended (e.g., an author defines the topics and/or trigger phrases that lead to selection of the topic), overlapping topics may be present. For example, one topic may be "Locations" that include "Sesame Street," and another topic "Television Shows" that also includes "Sesame Street." These topic definitions could result in an overlap that causes an ambiguity for the conversational AI system that will need to be resolved during a conversation session if not addressed in advance. Moreover, by the design of the system, cases of overlap are not necessarily exact string matches, but may also be synonyms or otherwise semantically similar phrases. As described in greater detail below, techniques described herein enable an author to view topic overlaps and resolve such overlaps to improve the functioning of the conversational AI system.

Identifying overlapping topics in a messaging environment as described herein has numerous advantages, including but not limited to overall improvement of the functioning of a messaging tool, such as a conversational AI system. For instance, by identifying overlapping topics and enabling authors to disambiguate topics with trigger phrases that are similar, a conversational AI system may better simulate human conversation by reducing the likelihood that the system asks a clarifying question or questions to identify the particular topic that the user is interested in. As these techniques enable more accurate parsing of user queries by identifying overlapping topics in advance, the conversational AI system may better and more efficiently interact with users. As a result, techniques described herein may provide improvements to the conversational AI system itself.

Furthermore, example embodiments described herein also improve the functioning of the computing systems and/or networks on which a conversational AI system is receiving or sending messages. For instance, because overlapping topics may be identified and resolved in advance (e.g., before a conversation begins between a user and the conversational AI system), additional clarifying questions (e.g., a question asking the user which topic the user is interested in) need not be generated and asked by the AI system. Such a reduction in these types of questions reduces the number of processing cycles used by the computing device(s) on which the conversational AI system operates and the user's computing device that receives and presents those messages from the AI system. Furthermore, reducing the need for these additional clarifying questions also reduces the amount of memory needed to store additional message information as well as the amount of data transmitted over a network between the AI system and the user. As a result, utilization of processing resources, memory resources, and networking resources may be improved in accordance with techniques described herein.

Example embodiments are described as follows for systems and methods for detecting overlaps in a messaging system (e.g., a conversational AI system). For instance, FIG. 1 shows a block diagram of a messaging system, according to an example embodiment. As shown in FIG. 1, system 100 includes a computing device 102, a computing device 108, and a computing device 118. Computing device 102 includes an agent interaction interface 104. Computing device 108 includes a conversational AI system 110. Conversational AI system 110 includes a virtual agent 112, an overlap detection system 114, and a testing interface 116. Computing device 118 includes a user interface 120. User interface 120 includes an authoring tool 122. Computing device 102, computing device 108, and computing device 118 may be communicatively coupled by a network 106. An example computing device that may incorporate the functionality of computing device 102, computing device 108, and computing device 118 (or any subcomponents therein, whether or not illustrated in FIG. 1) is described below in reference to FIG. 8. It is noted that system 100 may comprise any number of devices, including those illustrated in FIG. 1 and optionally one or more further devices or components not expressly illustrated. System 100 is further described as follows.

Network 106 may include one or more of any of a local area network (LAN), a wide area network (WAN), a personal area network (PAN), a combination of communication networks, such as the Internet, and/or a virtual network. In example implementations, computing device 102, computing device 108, and computing device 118 communicate via network 106. In an implementation, any one or more of computing device 102, computing device 108, and computing device 118 communicate over network 106 via one or more application programming interfaces (API) and/or according to other interfaces and/or techniques. Computing device 102, computing device 108, and computing device 118 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 102 includes one or more computing devices of one or more users (e.g., individual users, family users, enterprise users, governmental users, etc.) that each comprise one or more applications, operating systems, virtual machines, storage devices, etc. that may be used to interact with virtual agent 112. Computing device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. Computing device 102 is not limited to a physical machine, but may include other types of machines or nodes, such as a virtual machine. Computing device 102 may interface with other components illustrated in FIG. 1 through APIs and/or by other mechanisms.

Agent interaction interface 104 may comprise any user interface through which interaction with virtual agent 112 may be carried out. In examples, agent interaction interface 104 may comprise an application (e.g., a web browser, a chat application, a text-messaging application, an email application, etc.), an add-on or plug-in to an application, a service that is accessed or triggered upon performing an action on computing device 102 (e.g., visiting a website), or an application or service that is accessed on computing device 102 in other ways. Agent interaction interface 104 may comprise one or more interactive user interface (UI) elements that enable user interaction with a virtual agent 112. Examples of such UI elements include, but are not limited to, a text input portion, a message displaying portion, drop-down menu, one or more radio or other selectable buttons, icons, a listing, or other UI elements that enable the transmission and/or receipt of messages to and/or from another entity, such as virtual agent 112 that may comprise a chat bot.

For instance, agent interaction interface 104 may transmit one or more user-generated phrases (e.g., user queries or other interactions) inputted therein to virtual agent 112. In some examples, agent interaction interface 104 may comprise an interface (e.g., an interface associated with an organization) via which a user may provide user queries (e.g., customer support requests, etc.) to virtual agent 112. Agent interaction interface 104 may also be configured to receive one or more responses from virtual agent 112 in response to the user queries, such as messages, purchase confirmations, booking confirmations, emails, etc. These examples are only illustrative, and other types of communication between a user and another entity are contemplated.

Computing device 108 comprises one or more computing devices, servers, services, local processes, remote machines, web services, home assistant devices, virtual assistants, gaming consoles, entertainment systems, etc. for managing the messaging between one or more virtual agents (e.g., chat bots) and one or more users accessing agent interaction interface 104. For instance, computing device 108 may comprise a local computing device, a server coupled to an organization's network, a remotely located server, a collection of computing devices such as a network-accessible server (e.g., a cloud computing server network), or any other device or service that may manage the messaging between entities shown in FIG. 1 (and/or other entities not expressly shown).

Conversational AI system 110 comprises a messaging or other communication system that is semi-automated or fully automated. In some implementations, conversational AI system 110 may be configured to receive a query or other interaction from a user (e.g., user of agent interaction interface 104) and provide a response to agent interaction interface 104. As shown in FIG. 1, conversational AI system 110 includes a virtual agent 112, an overlap detection system 114, and a testing interface 116.

Virtual agent 112 may comprise one or more services in which an automated or semi-automated interaction service may be implemented, such as an artificial intelligence software program that may employ natural language processing techniques to simulate human interaction with end users (e.g., responding with information in a messaging interface, carry out one or more requested tasks, look up order or account information, etc.). In example implementations, virtual agent 112 may be configured to simulate human interaction via applications of one or more language models to parse received user queries and determine an appropriate message in response. In some example embodiments, virtual agent 112 comprises a chat bot for simulating conversation with a user. In implementations, virtual agent 112 may be configured to select a topic for conversation by identifying a trigger phrase that matches (e.g., identically or semantically) a received user query. In response to identifying a matching trigger phrase, virtual agent 112 may determine a topic for conversation with the user, and provide appropriate messaging in response (e.g., assisting with placing an order, looking up a reservation, etc.). Virtual agent 112 may comprise any interaction method, including but not limited to textual interaction (e.g., two-way messaging) and/or audible interaction (e.g., automated voice or speech interactions such as in automated telephone systems). It is also noted that disclosed techniques may be implemented in other contexts, such as parsing search queries (e.g., inputted to a website) that are matched to triggers in order to return an appropriate set of results (e.g., pages, categories, products, etc.) to a user.

Overlap detection system 114 is configured to process authored topics, which may include trigger phrases, and detect similarities between them (as described in greater detail below). For instance, overlap detection system 114 may be configured to process one or more trigger phrases associated with the topics, where such processing comprises generating a representation of each trigger phrase (e.g., generating a vector representation using one or more language models). Similarities between trigger phrases are detected based on a measure of similarity that is determined based at least on their representations. For instance, overlap detection system 114 may identify topics with trigger phrases that have a high degree of similarity with each other as overlapping topics (e.g., topics that have trigger phrases with similarities that blur the boundaries between topics), and store an indication of each of those overlapping topics (also referred to herein as overlapping topic pairs). Overlap detection system 114 may also generate a similarity score and/or a ranking based thereon for the overlapping topics. Authoring tool 122 (as described in greater detail below) may provide an identification of the topics that overlap with at least one other topic, a similarity score associated with the overlapping topics, and/or a ranking (e.g., a ranking of each topic by an associated similarity score with another topic). In some implementations, authoring tool 122 identifies one or more trigger phrases from the overlapping topics that caused the detection of the overlap. The author may be provided the ability, via authoring tool 122, to rewrite (e.g., edit) or remove any one or more of the trigger phrases that caused the overlap between the topics.

In this manner, overlap detection system 114 may enable authors to view and disambiguate overlapping topics, thereby reducing the need for virtual agent 112 to ask clarifying questions to users of agent interaction interface 104 in attempting to trigger a topic for conversation. As a result, improvements in the overall accuracy and usability of conversational AI system 110 may be achieved. Additional details relating to the operation of overlap detection system 114 will be described in greater detail below.

Testing interface 116 comprises a testing environment in which an author may provide test or sample queries to virtual agent 112 to evaluate its performance. For instance, testing interface 116 may enable an author or other individual to engage in a simulated conversation with virtual agent 112. The conversation may comprise a test query that includes a trigger phrase provided to virtual agent 112 to determine whether the test query results in virtual agent 112 identifying a plurality of topics for conversation, or whether the test query results in virtual agent 112 identifying only a single topic for conversation. For instance, where a test query indicates that virtual agent 112 identifies more than one topic for conversation, authoring tool 122 may be utilized to make a change to one more or trigger phrases to reduce the likelihood that virtual agent 112 identifies more than one topic for the same or similar queries. Testing interface 116 may be provided for presentation and/or interaction in authoring tool 122 or elsewhere in UI 120 as a window, pane, overlay, etc.

Computing device 118 includes one or more computing devices that comprise one or more applications, operating systems, virtual machines, storage devices, etc. that may be used to manage the operation and/or functionality of conversational AI system 110. Computing device 118 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. Computing device 118 is not limited to a physical machine, but may include other types of machines or nodes, such as a virtual machine. Computing device 118 may interface with other components illustrated in FIG. 1 through APIs and/or by other mechanisms.

User interface (UI) 120 includes one or more UI elements that enable customization and/or management of one or more features of conversational AI system 110. For instance, UI 120 may comprise an interface that includes one or more interactive UI elements that enable the configuration (e.g., by a user and/or programmatically) of aspects of conversational AI system 110 as described herein. In implementations, UI 120 may be accessed via a web browser by navigation to a web page, via an application stored on computing device 118, or other similar techniques. These examples are only illustrative, and UI 120 may provide any type, number, and/or arrangement of elements to manage and/or customize the manner in which conversational AI system 110 operates.

Authoring tool 122 may comprise an interface that provides a user with the ability to author and/or modify various aspects of conversational AI system 110. For instance, authoring tool 122 may comprise one or more UI elements for viewing, rewriting (e.g., modifying), creating and/or removing trigger phrases, topics, prompts, responses, or any other aspect that defines how virtual agent 112 operates. A trigger phrase includes one or more sets of words that, if included in a user query, triggers virtual agent 112 to select a particular topic for conversation for responding. A topic may include any subject or category for which virtual agent 112 can engage in simulated interaction. A single topic may be associated with a plurality of trigger phrases that, when received by virtual agent 112, are configured to trigger the virtual agent to select the topic for conversation. As an illustrative example, the trigger phrases "suspend subscription" or "cancel subscription renewal" could be assigned to a topic of "cancel subscription." Any number of trigger phrases and/or topics may be defined via authoring tool 122.

It is also noted that authoring tool 122 need not receive authoring information from users. In some other implementations, authoring tool 122 may be configured to import authoring information (e.g., trigger phrases, topics, and/or any other authoring information that defines how virtual agent 112 operates) from a file, another computing device, or via any other means. Furthermore, authoring tool 122 may provide one more UI elements to view, rewrite, create, and/or remove any authoring information that defines how virtual agent 112 operates (e.g., rewriting existing topics or trigger phrases, adding new ones, etc.). Still further, authoring tool 122 may comprise one or more UI elements that enable an author to selectively enable or disable certain features of conversational AI system 110, such as overlap detection system 114 (or any of the features contained therein).

In example embodiments, authoring tool 122 displays information generated by overlap detection system 114. For instance, authoring tool 122 may identify a ranking of overlapping topics, a similarity score (which may also be referred to as a severity score) associated with overlapping topics, a set of trigger phrases (e.g., descriptive phrases intended to trigger selection of a topic by a bot) that causes certain topics to overlap, and one or more UI elements that enables a user to rewrite and/or remove trigger phrases that cause topics to overlap. The similarity score may be based on a range of possible values (e.g., numerical values or percentages, grades, categories, etc.) with low values (e.g., 1 on a scale of 1-100) representing a low level of similarity with another topic and high values (e.g., 100 on the same scale of 1-100) representing a high level of similarity with another topic. In this manner, authoring tool 122 and/or overlap detection system 114 may enable a user to see and resolve overlapping topics, thereby improving the performance of virtual agent 112.

It is noted that implementations are not limited to the illustrative arrangement shown in FIG. 1. For instance, computing device 102, computing device 108, and/or computing device 118 need not be separate or located remote from each other. In some examples, any one or more of computing device 102, computing device 108, and/or computing device 118 (or any subcomponents therein) may be located in or accessible via the same computing device or distributed across a plurality of devices. For instance, techniques described herein may be implemented in a single computing device. Furthermore, system 100 may comprise any number of computing devices, virtual agents, networks, servers, or any other components coupled in any manner.

Figure 2:
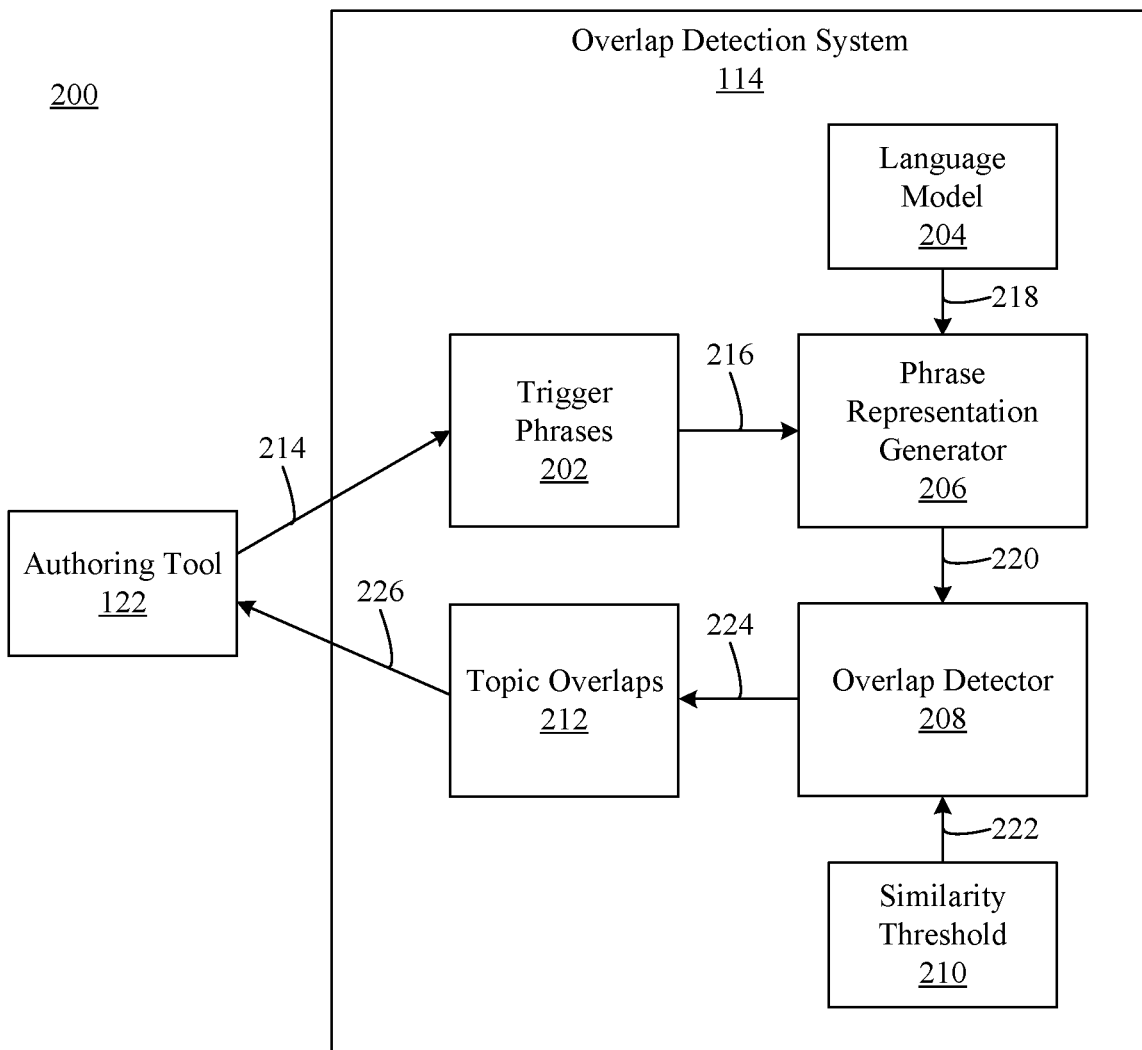
FIG. 2 shows a block diagram of a system for detecting overlapping topics in a messaging system, according to an example embodiment.

Overlap detection system 114 may operate in various ways to identify overlapping topics in a messaging environment. For instance, FIG. 2 shows a block diagram of a system for detecting overlapping topics in a messaging system, according to an example embodiment. As shown in FIG. 2, system 200 includes an example implementation of overlap detection system 114 and authoring tool 122. Overlap detection system 114 includes a set of trigger phrases 202, a language model 204, a phrase representation generator 206, an overlap detector 208, a similarity threshold 210, and one or more topic overlaps 212. Each of these components of system 200 are described in further detail as follows.

Authoring tool 122 may be used to define a plurality of trigger phrases 202 that are provided 214 to overlap detection system 114, where each trigger phrase may be associated with a topic. As described herein, a trigger phrase of the plurality of trigger phrases 202 may include a word or phrase that, when received by virtual agent 112, configured to trigger virtual agent 112 to select a corresponding topic for conversation. Trigger phrases 202 may comprise one or more text files, listings, databases, tables, or any other suitable data structures in which each trigger phrase is mapped to a corresponding topic. In examples, a topic may have a plurality of trigger phrases associated therewith. Trigger phrases 202 may be authored manually by a user (e.g., via authoring tool 122), imported from a set of pre-authored trigger phrases, or any combination thereof.

In examples, the set of trigger phrases 202 may comprise any number of trigger phrases related to any subject, such as customer service, e-commerce, travel reservations, multimedia, technology, etc. Accordingly, when a user of agent interaction interface 104 provides a query to initiate communication with virtual agent 112, virtual agent 112 may parse the user query (e.g., by generating a vector representation as described herein) to identify a topic associated with the user query based on the set of trigger phrases 202. For instance, if a user query comprises the words "stop subscription," virtual agent 112 may identify a topic associated with cancelling a subscription from trigger phrases 202. It is noted that virtual agent 112 need not observe a precise match between the user query and a trigger phrase of trigger phrases 202 to identify and/or select a topic for conversation. Rather, virtual agent 112 may identify similar words or phrases (e.g., synonyms or semantically similar phrases) based on the user query and identify and/or select a particular topic for conversation based on the similar words or phrases to the user query and trigger phrase 202. For example, virtual agent 112 may generate a vector representation of the received query, and determine a similarity of this vector representation with vector representations corresponding to each of trigger phrases 202 to identify a matching trigger phrase and/or topic (e.g., by identifying a trigger phrase with a high degree of similarity to the user query).

In some examples, virtual agent 112 may identify a plurality of possible topics for conversation based on the user query. For instance, virtual agent 112 may determine that the user query aligns with two or more trigger phrases of the set of trigger phrases 202, and therefore the user query may be associated with multiple topics. In such a scenario, virtual agent 112 may transmit a clarifying question (e.g., a "Did you mean" question) to agent interaction interface 104 to identify a particular topic for conversation from among the plurality of possible topics.

Overlap detection system 114 may reduce the likelihood of such clarifying questions in accordance with techniques described herein. For instance, phrase representation generator 206 may obtain or receive 216 the plurality of trigger phrases 202 and generate a representation for each trigger phrase contained therein. The representation may include any type of value that represents a meaning (e.g., a semantic meaning) of trigger phrase, such as a vector or other numerical representation (e.g., an array). In some implementations, the representation may comprise a vector in a multi-dimensional space. In example embodiments, phrase representation generator 206 may generate a representation for each trigger phrase by applying language model 204 to each trigger phrase.

Language model 204 comprises one or more language models that may be used to generate a vector or other representation for a word or phrase. In some examples, language model 204 comprises an embedding model configured to generate an embedding. An embedding model may comprise a deep-learning model that may be configured to map a word or sequence of words to a numerical value, such as a multi-dimensional vector. The embedding model may be trained based on an algorithm that utilizes language data that comprises the usage of words in a given language, such as books, academic literature, dictionaries, encyclopedias, data available on the Internet, newspapers, other language models, and/or any other language data. In some implementations, the embedding model may be trained based on millions or billions of word or word combinations and comprise hundreds or even thousands of dimensions. It is noted that although certain examples are discussed herein that include generating an embedding based on an embedding model, embodiments are not limited to these examples. Phrase representation generator 206 may be configured to generate any other suitable type of representations (e.g., vectors) for each trigger phrase of the plurality of trigger phrases 202.

Examples of algorithms that may be used to train and/or generate a language model 204 include, but are not limited to Word2Vec, designed by Google LLC, Global Vector (GloVe) designed by Stanford University, and fastText designed by Facebook, Inc. Furthermore, language model 204 may be trained using various types of learning techniques as will be appreciated to those skilled in the relevant arts, including but not limited to skip-gram, co-occurrence learning, negative sampling, etc. These examples are illustrative only and may include other algorithms for training language model 204, including any other natural language processing (NLP) or natural language understanding (NLU) methods appreciated to those skilled in the relevant arts.

Language model 204 may be generated in various forms. For instance, language model 204 may be generated according to a suitable supervised and/or unsupervised machine-learning algorithm. For instance, language model 204 may be generated by implementing a vector space learning algorithm to generate the embedding model as a vector space model. As a vector space model, language model 204 may represent individual words or sequences of words in a continuous vector space (e.g., a multi-dimensional space), where similar words or sequences of words are mapped to nearby points or are embedded near each other. Furthermore, an artificial neural network learning algorithm may be used to generate and/or train language model 204 as a neural network that is an interconnected group of artificial neurons. The neural network may be presented with word or sequence of words to identify a representation of the inputted word or sequences of words. Language model 204 could be implemented using any suitable neural network architecture.

When phrase representation generator 206 applies a trigger phrase of trigger phrases 202 to language model 204, phrase representation generator 206 generates a vector representation of the trigger phrase. In this way, language model 204 may be applied 218 by phrase representation generator 206 to generate a vector representation for a single word, a word span that comprises several words, or an entire sentence (e.g., by combining one or more representations for individual words in the trigger phrase) present in each trigger phrase.

Overlap detector 208 may be configured to generate measures of similarity based at least on the vector representations generated by and obtained 220 from phrase representation generator 206. In examples, each measure of similarity may represent a degree of similarity between a respective pair of vector representations. In other words, each measure of similarity may be indicative of how similar (e.g., a level or degree of semantic similarity) one trigger phrase of trigger phrases 202 is to another trigger phrase of trigger phrases 202 based on their respective vector representations. Based at least on the measures of similarity, overlap detector 208 may be configured to identify pairs of trigger phrases that overlap. Accordingly, overlap detector 208 may determine a measure of similarity between a vector representation of one trigger phrase with or more vector representations of other trigger phrases, and store an indication for each pair of vector representations that has a similarity score above similarity threshold 210. Pairs of vector representations that have a similarity score above a threshold may be identified as overlapping. In examples, similarity threshold 210 may be obtained 222 by overlap detector 208 and comprise a minimum measure of similarity between two or more phrase representations to identify the trigger phrases as overlapping. Similarity threshold 210 may be predefined in some implementations, or may be customizable by a user (e.g., via user interface 120) in other implementations. Overlapping topics may include any topics that has at least one trigger phrase that overlaps with a trigger phrase of another topic (i.e., a pair of trigger phrases that has a similarity score above a threshold).

Accordingly, for each pair of trigger phrases comprising vector representations that have a measure of similarity above similarity threshold 210, overlap detector 208 may be configured to detect the presence of a topic overlap, and store 224 an indication of the overlap in a set of topic overlaps 212. In some implementations, the indication may also comprise the similarity score or other score indicative of a level or degree of similarity between trigger phrases. Overlap detector may be configured to generate a ranking or prioritization based on such a score and store such information as part of topic overlaps 212, such that trigger phrases with the highest similarity score appear at the top of a list presented in authoring tool 122 and/or may be selectively ranked by users of the tool.

In some implementations, topic overlaps 212 may store information for each trigger phrase that is overlapping with another trigger phrase and/or each topic that has an overlapping trigger phrase with another topic. For instance, topic overlaps 212 may store an indication that a first topic comprising a first trigger phrase is overlapping (e.g., similar) with a second topic comprising a second trigger phrase, based at least on the phrase representations of the first and second trigger phrases having a similarity score above similarity threshold 210.

Topic overlaps 212 may be presented or provided 226 to authoring tool 122 such that a user of authoring tool 122 may view each topic (and/or its associated trigger phrase) that is similar with another topic (and/or its associated trigger phrases). As noted earlier, authoring tool 122 may also be configured to rank the topic overlaps based at least on the similarity score associated with each topic overlap, enabling a user to prioritize overlapping topic pairs that may be more problematic than others. In implementations, authoring tool 122 may provide one or more interactive UI elements identifying each trigger phrase causing the topic overlap (e.g., a trigger phrases with a vector representation that has a measure of similarity above similarity threshold 210 with a vector representation of a trigger phrase of another topic). Authoring tool 122 may also provide one or more interactive UI elements, that when activated, enable a user to change one or more of the overlapping trigger phrases, such as enabling a user to modify characters or words in a trigger phrase or remove a trigger phrase from an overlapping topic altogether.

In some implementations, overlap detector 208 may be configured to update the set of topic overlaps 212 each time authoring tool 122 is used to makes a change to trigger phrases 202, such as providing a new trigger phrase, rewriting (e.g., editing) an existing trigger phrase, or removing (e.g., deleting) a trigger phrase. The update may occur automatically (e.g., in response to a change received in authoring tool 122), or may be triggered in response to activation of an interactive element in authoring tool 122 (e.g., an update icon). The set of topic overlaps 212 may also be updated at any other time or in accordance with any interval, such as at a predetermined period of time after a change is made to trigger phrases 202, and/or periodically. In some implementations, overlap detector 208 may update topic overlaps 212 in real-time or near-real time as a user is authoring a trigger phrase in authoring tool 122, such as by presenting, in authoring tool 122, a real-time notification of a topic overlap as the user is typing and/or as the user has completed an input of a trigger phrase for a topic.

In this manner, a citizen developer (e.g., a user that does not have any specialized training or expertise in the development of virtual agent 112) can readily determine, based on trigger phrases authored, whether such phrases have similarities that would hinder the performance of virtual agent 112. Techniques described herein may bring transparency to the authoring process and conversational AI used in dialog (e.g., by identifying types of queries that may make it difficult for virtual agent 112 to select a topic).

Figure 3:
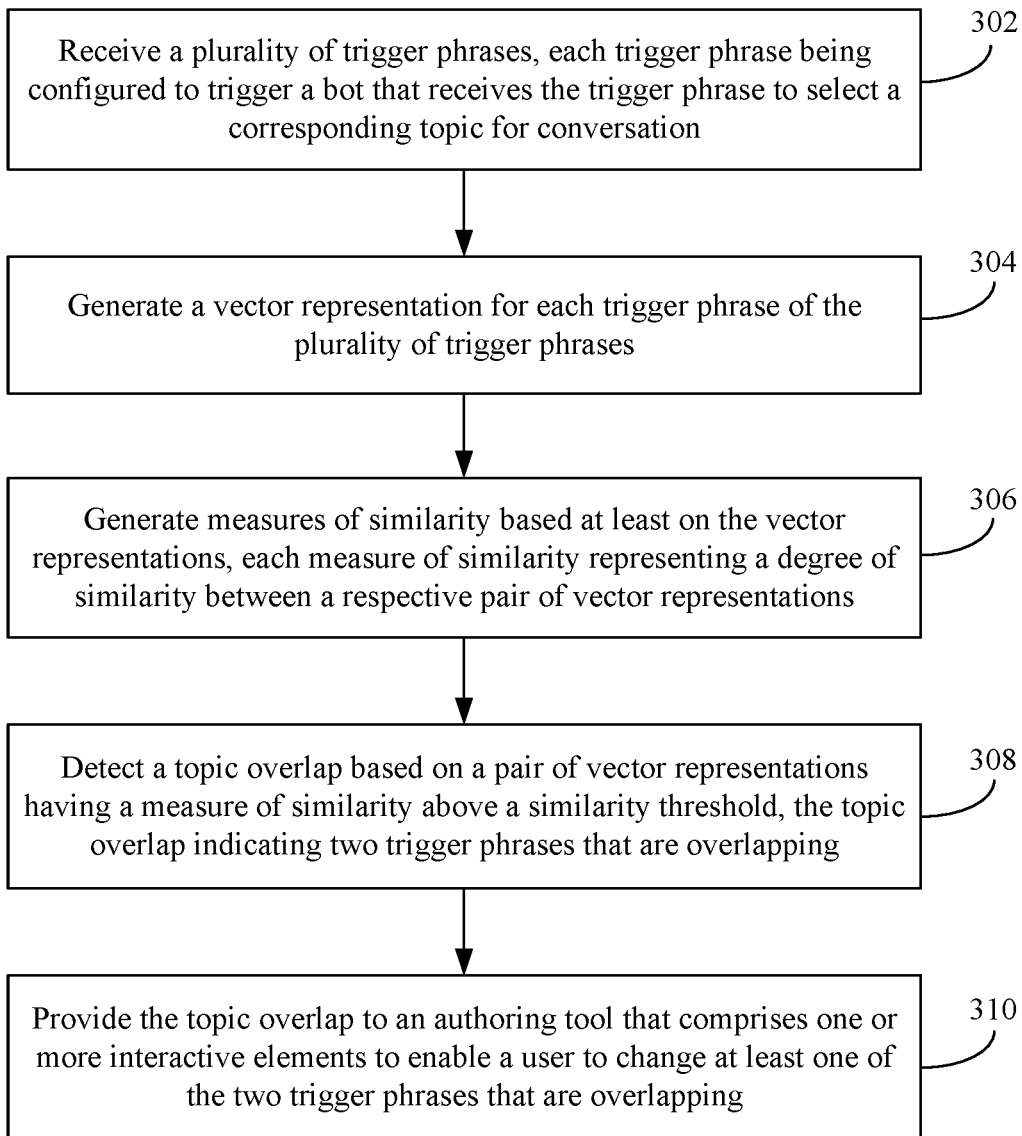
FIG. 3 shows a flowchart of a method for detecting overlapping topics in a messaging system, in accordance with an example embodiment.

Overlap detection system 114 may operate in various ways to detect overlapping topics in messaging systems. For instance, overlap detection system 114 may operate according to FIG. 3. FIG. 3 shows a flowchart 300 of a method for detecting overlapping topics in a messaging system, in accordance with an example embodiment. For illustrative purposes, flowchart 300 and overlap detection system 114 are described as follows with respect to FIGS. 1 and 2. While example embodiments are described with respect to components of system 100, system 200, and flowchart 300, these examples are illustrative.

Flowchart 300 begins with step 302. In step 302, a plurality of trigger phrases is received, each trigger phrase being configured to trigger a bot that receives the trigger phrase to select a corresponding topic for conversation. For instance, with reference to FIG. 2, phrase representation generator 206 may be configured to receive trigger phrases 202, as described herein. The set of trigger phrases 202 may be received as one or more files (e.g., as raw text, tables, spreadsheets, etc.) or in any other format. Trigger phrases 202 may comprise a set of trigger phrases that define the operation of a bot (e.g., virtual agent 112). Each trigger phrase of trigger phrases 202 may be configured to trigger a bot that receives the trigger phrase to select a corresponding topic for conversation. For example, a trigger phrase of "suspend subscription" (or a semantically similar phrase), when provided to a bot, causes the bot to select a corresponding topic of "cancel subscription," and initiate a conversation with a user to cancel their subscription. Each trigger phrase that is authored as part of conversational AI system 110 may be received by phrase representation generator 206.

In step 304, a vector representation is generated for each trigger phrase of the plurality of trigger phrases. For instance, with reference to FIG. 2, phrase representation generator 206 may be configured to generate a vector representation, for each trigger phrase of trigger phrases 202, as described herein. In examples, phrase representation generator 206 may be configured to apply language model 204 to each trigger phrase to generate each vector representation. In some implementations, the vector representation may comprise an embedding generated by applying language model 204. In this manner, phrase representation generator 206 may be configured to generate a plurality of vector representations, each vector representation corresponding to a trigger phrase of the set of trigger phrases 202.

In step 306, measures of similarity are generated based at least on the vector representations, each measure of similarity representing a degree of similarity between a respective pair of vector representations. For instance, with reference to FIG. 2, overlap detector 208 may be configured to generate measures of similarity based at least on the generated vector representations, as described herein. As described above, each measure of similarity may represent or indicate a degree of similarity (e.g., semantic similarity) between a pair of vector representations. For example, overlap detector 208 may generate a measure of similarity (e.g., a cosine similarity) between a first vector representation corresponding to a first trigger phrase and a second vector representation corresponding to a second trigger phrase in the set of trigger phrases 202. In some implementations, the measures of similarity may be generated for vector representations corresponding to trigger phrases belonging to different topics (e.g., a similarity between each vector representation of one topic to each vector representation of other topics). In this manner, overlap detector 208 may generate a set of measures of similarity, with each measure of similarity indicating a degree of similarity between different vector representations.

In step 308, a topic overlap is detected based on a pair of vector representations having a measure of similarity above a similarity threshold, the topic overlap indicating two trigger phrases that are overlapping. For instance, with reference to FIG. 2, overlap detector 208 may be configured to detect a topic overlap based on a pair of vector representations having a measure of similarity above similarity threshold 210, as described herein. The topic overlap may indicate two trigger phrases (i.e., the two trigger phrases that correspond to the vector representations in this pair of vector representations) that are overlapping. A determination of a topic overlap may therefore indicate that the two topics comprise trigger phrases that have a semantic similarity above a threshold, such that if either trigger phrase is provide to a bot, the bot may identity both corresponding topics as possible topics for conversation. In other words, if the bot is provided with either of the two trigger phrases that are overlapping as detected by overlap detector 208, the bot may be configured to identify two topics for conversation (which, if unresolved, can lead to additional interaction between the user and the bot as described herein). Information associated with each topic overlap (e.g., a topic name, trigger phrase(s), similarity scores, etc. associated with the detected topic overlap) may be stored as a set of topic overlaps 212. While examples are described herein that two topics or trigger phrases may overlap, any number of topics or trigger phrases may be identified as overlapping with each other based on their semantic similarity.

In step 310, the topic overlap is provided to an authoring tool that comprises one or more interactive elements to enable a user to change at least one of the two trigger phrases that are overlapping. For instance, with reference to FIG. 2, overlap detector 208 may be configured to provide the topic overlap (e.g., individually or as a set of topic overlaps 212) to authoring tool 122, as described herein. Authoring tool 122 may comprise one or more interactive elements, that when activated, enable a user to change (e.g., rewrite or remove) at least one of the two trigger phrases that are overlapping in the particular topic overlap.

By identifying overlapping topics in the disclosed manner, changes may be made to the authoring of a bot in a more efficient manner such that the bot exhibits an improved performance (e.g., more efficiently identifying topics of conversation associated with user queries, which can reduce the number of messages that need to be generated, transmitted, and/or stored) during interaction with users. Furthermore, because techniques described herein need not utilize actual user queries to identify overlapping topics, improvements to the performance of the bot may be achieved during development or authoring of the bot, thereby improving the likelihood of an optimally performing bot once deployed.

Figure 4:
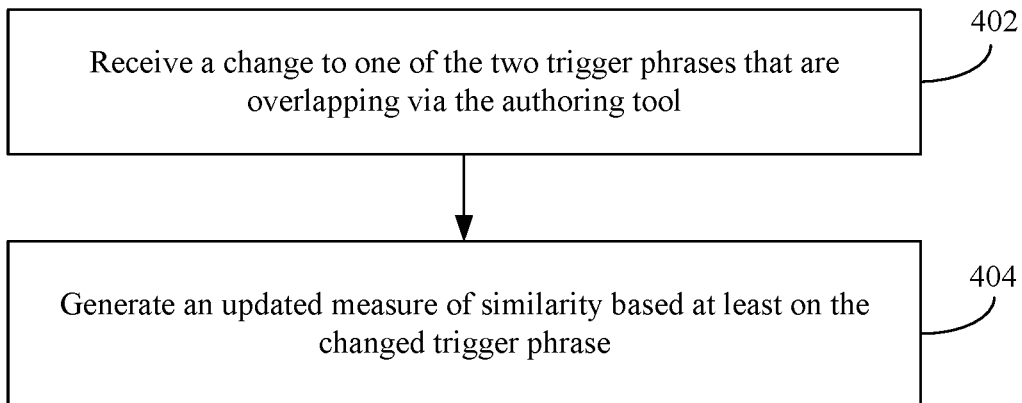
FIG. 4 shows a flowchart of a method for receiving a change to an overlapping trigger phrase, in accordance with an example embodiment.

As discussed above, overlap detection system 114 may be configured to update similarity scores associated with a topic overlap. For instance, FIG. 4 shows a flowchart 400 of a method for receiving a change to an overlapping trigger phrase, in accordance with an example embodiment. In an implementation, the method of flowchart 400 may be implemented by components of overlap detection system 114. FIG. 4 is described with continued reference to FIGS. 1 and 2. Other structural and operational implementations will be apparent to persons skilled in the relevant art(s) based on the following discussion regarding flowchart 400, system 100 of FIG. 1, and system 200 of FIG. 2.

Flowchart 400 begins with step 402. In step 402, a change to one of the two trigger phrases that are overlapping is received. For instance, with reference to FIG. 2, authoring tool 122 may provide one or more interactive elements that may enable a user to change one or more trigger phrases associated with a topic overlap (e.g., to resolve the overlap). When a user interacts with the interactive elements to make a change to one or more overlapping trigger phrases, authoring tool 122 may receive an indication of the change and provide the change to update the set of trigger phrases 202.

In step 404, an updated measure of similarity is generated based at least on the changed trigger phrase. For instance, with reference to FIG. 2, phrase representation generator 206 may be configured to generate a vector representation as described herein for the one or more trigger phrases that were changed via interaction with authoring tool 122. In response to the generating a vector representation for each changed trigger phrase, overlap detector 208 may be configured to generate a measure of similarity in a similar manner as described herein. In some implementations, phrase representation generator 206 and overlap detector 208 may configured to generate an updated measure of similarity automatically (e.g., without further input from a user after the user provides the change to a trigger phrase in authoring tool 122), or manually (e.g., via an interactive element to generated one or more updated measures of similarity). In some implementations, once a change is received to one of the two trigger phrases, a bot may be configured to select a single topic for conversation when receiving a user query that is the same or semantically similar to changed trigger phrase (whereas prior to the change being provided, the bot may identify a several topics for conversation due to the topic overlap being present).

In some examples, if the updated vector representation associated with the changed trigger phrase still has a measure of similarity with a vector representation of another trigger phrase that is above similarity threshold 210, an updated measure of similarity based thereon may be provided to authoring tool 122 to indicate that a topic overlap is still present. In other examples, the updated measure of similarity may be provided to authoring tool 122 for presentation even if the measure of similarity is below similarity threshold 210.

Figure 5:
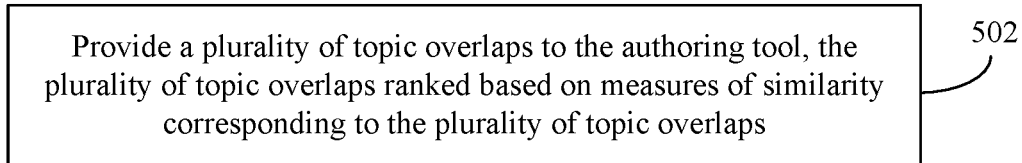
FIG. 5 shows a flowchart of a method for ranking a plurality of topic overlaps, in accordance with an example embodiment.

As discussed above, overlap detection system 114 may be configured to rank a plurality of topic overlaps. For instance, FIG. 5 shows a flowchart 500 of a method for ranking a plurality of topic overlaps, in accordance with an example embodiment. In an implementation, the method of flowchart 500 may be implemented by components of overlap detection system 114. FIG. 5 is described with continued reference to FIGS. 1 and 2. Other structural and operational implementations will be apparent to persons skilled in the relevant art(s) based on the following discussion regarding flowchart 500, system 100 of FIG. 1, and system 300 of FIG. 3.

Flowchart 500 begins with step 502. In step 502, a plurality of topic overlaps is provided to the authoring tool, the plurality of topic overlaps ranked based on measures of similarity corresponding to the plurality of topic overlaps. For instance, with reference to FIG. 2, overlap detector 208 may be configured to provide to authoring tool 122 a plurality of topic overlaps (e.g., set of topic overlaps 212) along with a measure of similarity (e.g., a similarity score) corresponding to each one, and/or a ranking based thereon. In this manner, authoring tool 122 may be configured to present a ranked list of topic overlaps as detected by overlap detector 208, ranked based on their corresponding measures of similarity. Such a ranking may enable users of authoring tool 122 to readily determine which topics have a greater amount of overlap and therefore can be prioritized for resolution.

FIG. 6 shows an illustrative user interface 600 for presenting overlapping topic information, according to an example embodiment. For instance, as shown in FIG. 6, UI 600 may comprise one example implementation of authoring tool 122. In UI 600, an overlapping topic pane 602 is presented therein that contains a listing of each overlapping topic and a similarity score associated with each overlapping topic (e.g., as determined by overlap detection system 114). In one implementation, overlapping topic pane 602 of UI 300 may also show, for each overlapping topic, a number of other topics (or trigger phrases) that overlap with the listed topic (or the listed topic's trigger phrases). As discussed above, the similarity score may be determined by overlap detection system 114 as it evaluates how semantically similar trigger phrases of topics are to each other (e.g., how much overlap is present between trigger phrases, either identically or semantically). A higher similarity score, as shown in overlapping topic pane 602, may indicate that a particular topic has one or more trigger phrases that are close to another topics trigger phrases.

As described above, overlapping topic pane 602 may be configured to group together one or more trigger phrases belonging to a single topic together, such that overlapping topic pane 602 provides a listing of topics that overlap with other topics (which can be interacted with to obtain further information, such as trigger phrases that contributed to the topic overlap being detected). Such an arrangement may enable an author to more efficiently navigate through authoring tool 122 to identify topic that may need attention, thereby providing improvements to the user interface in addition to other improvements noted herein. Displaying of topic information, however, is not required in all implementations, and it is noted that overlapping topic pane 602 may be configured to display overlapping trigger phrases without displaying a corresponding topic name.

Similarity scores for an overlapping topic that comprises multiple overlapping trigger phrases may be generated in various ways. For instance, the similarity scores for each overlapping topic may be based on an average of the individual similarity scores for each pair of overlapping trigger phrases. In some examples, the average may comprise a weighted average (e.g., by weighting higher similarity scores more heavily than lower similarity scores), which may further enable a user to more efficiently prioritize which topics may have overlaps that need to be resolved.

Overlapping topic pane 602 may include any arrangement of interactive elements for an author to view, create, rewrite, and/or remove topics or trigger phrases, whether or not expressly illustrated in FIG. 6. For instance, overlapping topic pane 602 may include one or more UI elements that, when activated, sort the list of overlapping topics by similarity score, topic name, number of trigger phrase overlaps, or any other means. Furthermore, when a particular score, topic, or number of overlaps is selected, overlapping topic pane 602 may be configured to present additional information associated with the selected option, such as identifying each trigger phrase for the particular topic and/or each trigger phrase of other topics that contributed to the identification of the topic overlap, additional details regarding how the similarity score was generated, etc. Overlapping topic pane 602 may also include other elements or functions not shown, such as a testing pane (e.g., testing interface 116) in which an author can submit a test query to virtual agent 112 to evaluate its performance, as described herein.

FIG. 7 shows an illustrative user interface 700 for presenting overlapping topic information, according to an example embodiment. For instance, as shown in FIG. 7 UI 700 may comprise another example implementation of authoring tool 122. In UI 700, an overlapping topic information pane 702 may be provided as a separate pane (e.g., as an additional window, an overlay, etc.) providing additional details when a particular overlapping topic in the list of overlapping topics is selected. For example, as shown in FIG. 7, when a "Cancel subscription" topic is selected from the list of overlapping topics, additional details are shown in overlapping topic information pane 702 that show any overlapping topics related to the "Cancel subscription" topic, including details relating to the trigger phrases of the overlapping topics that contributed to the overlap being detected. In this example, a first trigger phrase "suspend subscription" associated with the "Cancel subscription" topic semantically overlaps with the trigger phrase "stop paper subscription" in the "Paper subscriptions" topic, and is thus presented in UI 700 as a pair of overlapping topics.

In this particular example, overlap detection system 114 has determined that such trigger phrases have a semantically similar relationship (e.g., the trigger phrases contain similar phrases, words, grammar, etc.) in accordance with techniques described herein. If left unresolved, virtual agent 112 may not know which topic to select if a user query is received that contains either trigger phrase (or a phrase that is semantically similar to either trigger phrase), which may cause virtual agent 112 to ask a follow-up question to the user to resolve the confusion in order to identify the particular topic to open for conversation (e.g., a "What did you mean?" question may be asked to the user).

In accordance with techniques described herein, identifying semantically similar trigger phrases can enable a user to interact with authoring tool to improve the performance of virtual agent 112, such as by identifying topics that themselves are similar and could be consolidated to simplify the authoring process, rewriting or removing trigger phrases that contribute to an overlap being detected, or making any other editing changes to topics and/or trigger phrases to make topics more distinct from each other. As shown in UI 700, one or more selectable elements may be included that when activated enable an author to launch illustrative topic overlap details pane 702 that provides additional details for a particular topic (e.g., where additional trigger phrases can be added, phrases can be removed, phrases can be modified, etc.). Further, UI 700 includes one or more elements in the topic overlap details pane 702 in which changes to one or more overlapping trigger phrases can be made, such as a rewrite of the overlapping trigger phrase or removal of the trigger phrase. By providing such change abilities in the topic overlap details pane, additional navigation within UI 700 to in order to make changes to overlapping trigger phrases may not be necessary, thereby simplifying and improving the overall user interface for authoring.

Topic overlap details pane 702 may include one more additional interactive elements to save changes such that they may be applied or to cancel such changes. In examples, after a save option is selected in the topic overlap details pane, an overlapping status (which may include any of the information shown in UI 600 and/or UI 700) may automatically be refreshed (e.g., overlap detection system 114 may perform an updated based on a revised set of trigger phrases that includes the author's most recent changes). In some implementations, UI 600 and/or UI 700 may include one or more elements for manually refreshing a topic overlap status.

The arrangement in FIGS. 6 and 7 are illustrative only, and any suitable arrangement of information generated and/or described herein is contemplated. Further, UI 600 and/or UI 700 may contain one or more additional elements not shown. Examples of additional elements that can be presented therein include, but are not limited to, one or more tables, graphs, charts, etc. that may indicate historical and/or statistical information relating to prior user queries, such as a number or percentage of queries that were matched to a topic, queries that were matched to a plurality of possible topics, and/or queries that did not match with any topics. Some of this information may also be provided to overlap detector 206, such as to elevate or lower a similarity score for a pair of topics based on a number of observed chat sessions in which both of the topics were identified as possible topics for conversation by the bot.

III. Example Mobile and Stationary Device Embodiments

Computing device 102, agent interaction interface 104, computing device 108, conversational AI system 110, virtual agent 112, overlap detection system 114, testing interface 116, computing device 118, user interface 120, authoring tool 122, trigger phrases 202, language model 204, phrase representation generator 206, overlap detector 208, similarity threshold 210, topic overlaps 212, UI 600, UI 700, flowchart 300, flowchart 400, and/or flowchart 500 may be implemented in hardware, or hardware combined with one or both of software and/or firmware. For example, computing device 102, agent interaction interface 104, computing device 108, conversational AI system 110, virtual agent 112, overlap detection system 114, testing interface 116, computing device 118, user interface 120, authoring tool 122, trigger phrases 202, language model 204, phrase representation generator 206, overlap detector 208, similarity threshold 210, topic overlaps 212, UI 600, UI 700, flowchart 300, flowchart 400, and/or flowchart 500 may be implemented as computer program code/instructions configured to be executed in one or more processors and stored in a computer readable storage medium.

Alternatively, computing device 102, agent interaction interface 104, computing device 108, conversational AI system 110, virtual agent 112, overlap detection system 114, testing interface 116, computing device 118, user interface 120, authoring tool 122, trigger phrases 202, language model 204, phrase representation generator 206, overlap detector 208, similarity threshold 210, topic overlaps 212, UI 600, UI 700, flowchart 300, flowchart 400, and/or flowchart 500 may be implemented as hardware logic/electrical circuitry.

For instance, in an embodiment, one or more, in any combination, of computing device 102, agent interaction interface 104, computing device 108, conversational AI system 110, virtual agent 112, overlap detection system 114, testing interface 116, computing device 118, user interface 120, authoring tool 122, trigger phrases 202, language model 204, phrase representation generator 206, overlap detector 208, similarity threshold 210, topic overlaps 212, UI 600, UI 700, flowchart 300, flowchart 400, and/or flowchart 500 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
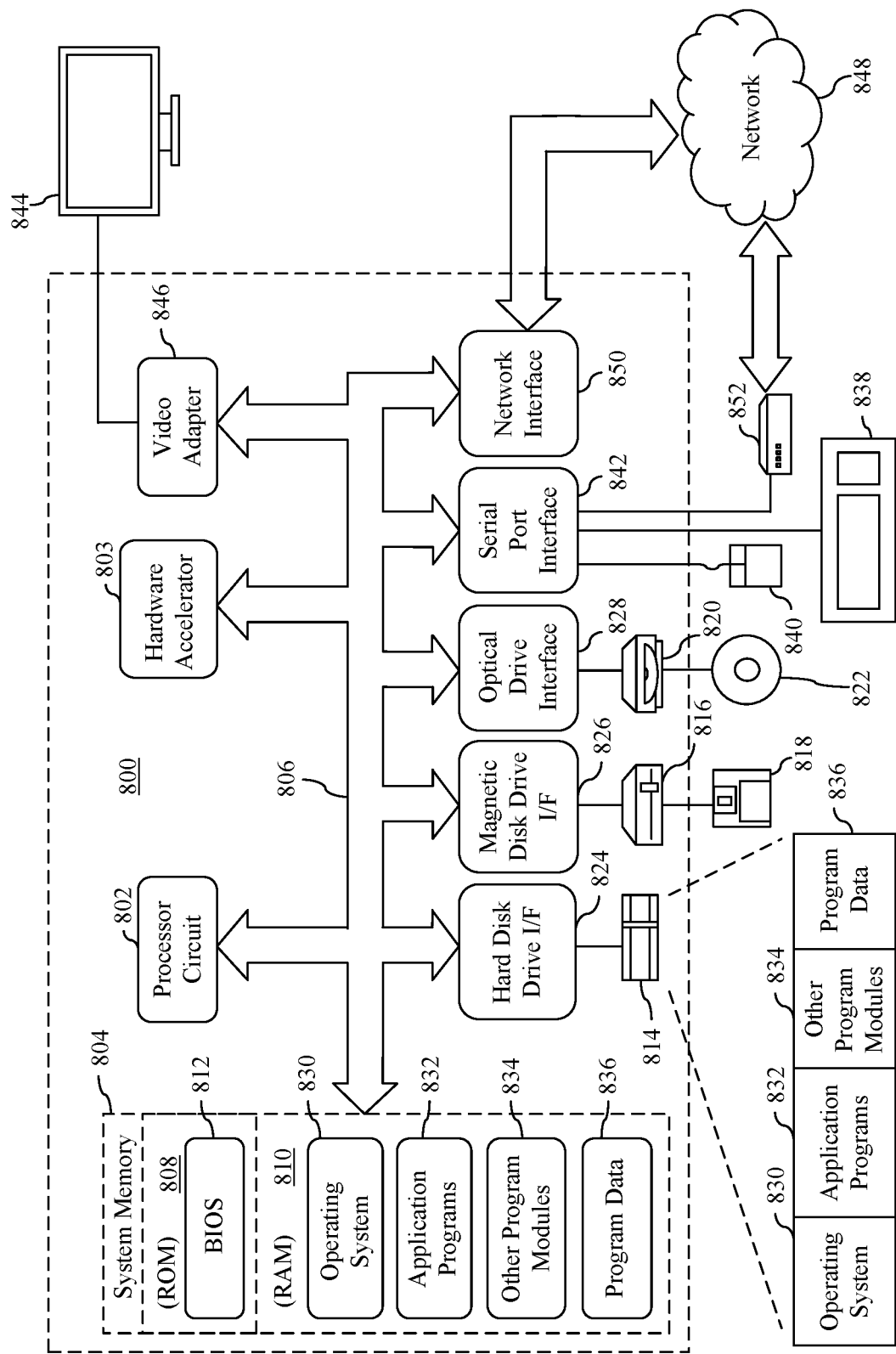
FIG. 8 shows a block diagram of an example computing device that may be used to implement example embodiments.

FIG. 8 depicts an exemplary implementation of a computing device 800 in which embodiments may be implemented. For example, computing device 102, agent interaction interface 104, computing device 108, conversational AI system 110, virtual agent 112, overlap detection system 114, testing interface 116, computing device 118, user interface 120, authoring tool 122, trigger phrases 202, language model 204, phrase representation generator 206, overlap detector 208, similarity threshold 210, topic overlaps 212, UI 600, UI 700, flowchart 300, flowchart 400, and/or flowchart 500 (and/or any of the steps of flowcharts 300, 400, and/or 500) may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a hardware accelerator 803, a system memory 804, and a bus 806 that couples various system components including system memory 804 to processor circuit 802 and hardware accelerator 803. Processor circuit 802 and/or hardware accelerator 803 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing any of the features of computing device 102, agent interaction interface 104, computing device 108, conversational AI system 110, virtual agent 112, overlap detection system 114, testing interface 116, computing device 118, user interface 120, authoring tool 122, trigger phrases 202, language model 204, phrase representation generator 206, overlap detector 208, similarity threshold 210, topic overlaps 212, UI 600, UI 700, flowchart 300, flowchart 400, and/or flowchart 500 and/or further embodiments described herein.

A user may enter commands and information into computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with propagating signals and communication media (do not include propagating signals and communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for detecting overlapping topics in a messaging system is disclosed herein. The system includes at least one processor circuit; and at least one memory that stores program code configured to be executed by the at least one processor circuit, the program code comprising: a phrase representation generator configured to: receive a plurality of trigger phrases, each trigger phrase being configured to trigger a bot that receives the trigger phrase to select a corresponding topic for conversation, and generate a vector representation for each trigger phrase of the plurality of trigger phrases; and an overlap detector configured to: generate measures of similarity based at least on the vector representations, each measure of similarity representing a degree of similarity between a respective pair of vector representations; detect a topic overlap based on a pair of vector representations having a measure of similarity above a similarity threshold, the topic overlap indicating two trigger phrases that are overlapping; and provide the topic overlap to an authoring tool, wherein the authoring tool comprises one or more interactive elements to enable a user to change at least one of the two trigger phrases that are overlapping.

In one implementation of the foregoing system, the bot is configured to identify two topics for conversation when provided with either trigger phrase of the two trigger phrases that are overlapping.

In another implementation of the foregoing system, the authoring tool is configured to receive a change to one of the two trigger phrases that are overlapping, and the bot is configured to select a single topic for conversation when provided with the changed trigger phrase.

In another implementation of the foregoing system, each measure of similarity is indicative of a degree of semantic similarity between a first vector representation corresponding to a first trigger phrase and a second vector representation corresponding to a second trigger phrase.

In another implementation of the foregoing system, the system further includes a testing interface configured to enable a simulated conversation with the bot, the simulated conversation comprising a conversation to determine whether a trigger phrase provided to the bot causes the bot to identify a plurality of topics for conversation.

In another implementation of the foregoing system, the overlap detector is configured to provide a plurality of topic overlaps to the authoring tool, the plurality of topic overlaps ranked based on measures of similarity corresponding to the plurality of topic overlaps.

In another implementation of the foregoing system, the authoring tool is configured to receive a change to one of the two trigger phrases that are overlapping, and the overlap detector is configured to automatically generate an updated measure of similarity based at least on the changed trigger phrase.

In another implementation of the foregoing system, the bot includes a chat bot configured to simulate human conversation with a user.

In another implementation of the foregoing system, the vector representation includes an embedding generated by applying a language model to each trigger phrase of the plurality of trigger phrases.

A method for detecting overlapping topics in a messaging system is disclosed herein. The method includes receiving a plurality of trigger phrases, each trigger phrase being configured to trigger a bot that receives the trigger phrase to select a corresponding topic for conversation; generating a vector representation for each trigger phrase of the plurality of trigger phrases; generating measures of similarity based at least on the vector representations, each measure of similarity representing a degree of similarity between a respective pair of vector representations; detecting a topic overlap based on a pair of vector representations having a measure of similarity above a similarity threshold, the topic overlap indicating two trigger phrases that are overlapping; and providing the topic overlap to an authoring tool, wherein the authoring tool includes one or more interactive elements to enable a user to change at least one of the two trigger phrases that are overlapping.

In one implementation of the foregoing method, providing either trigger phrase of the two trigger phrases that are overlapping to the bot causes the bot to identify two topics for conversation.

In another implementation of the foregoing method, the method further includes receiving a change to one of the two trigger phrases that are overlapping via the authoring tool, wherein providing the changed trigger phrase to the bot causes the bot to select a single topic for conversation.

In another implementation of the foregoing method, each measure of similarity is indicative of a degree of semantic similarity between a first vector representation corresponding to a first trigger phrase and a second vector representation corresponding to a second trigger phrase.

In another implementation of the foregoing method, the method further includes providing a testing interface that enables a simulated conversation with the bot, the simulated conversation comprising a conversation to determine whether a trigger phrase provided to the bot causes the bot to identify a plurality of topics for conversation.

In another implementation of the foregoing method, the method further includes providing a plurality of topic overlaps to the authoring tool, the plurality of topic overlaps ranked based on measures of similarity corresponding to the plurality of topic overlaps.

In another implementation of the foregoing method, the method further includes receiving a change to one of the two trigger phrases that are overlapping; and automatically generating an updated measure of similarity based at least on the changed trigger phrase.

In another implementation of the foregoing method, the bot includes a chat bot configured to simulate human conversation with a user.

In another implementation of the foregoing method, the vector representation includes an embedding generated by applying a language model to each trigger phrase of the plurality of trigger phrases.

A computer-readable storage medium is disclosed herein. The computer-readable storage medium has program instructions recorded thereon that, when executed by at least one processor of a computing device, perform a method, the method including: receiving a plurality of trigger phrases, each trigger phrase being configured to trigger a bot that receives the trigger phrase to select a corresponding topic for conversation; generating a vector representation for each trigger phrase of the plurality of trigger phrases; generating measures of similarity based at least on the vector representations, each measure of similarity representing a degree of similarity between a respective pair of vector representations; detecting a topic overlap based on a pair of vector representations having a measure of similarity above a similarity threshold, the topic overlap indicating two trigger phrases that are overlapping; and providing the topic overlap to an authoring tool, wherein the authoring tool comprises one or more interactive elements to enable a user to change at least one of the two trigger phrases that are overlapping.

In one implementation of the foregoing computer-readable medium, the method further includes: receiving a change to one of the two trigger phrases that are overlapping via the authoring tool, wherein providing the changed trigger phrase to the bot causes the bot to select a single topic for conversation.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the disclosed subject matter should not be limited by any of the above-described example embodiments, but should be defined only in accordance with the following claims and their equivalents.

What is claimed is:

1. A system for detecting overlapping topics in a messaging system, the system comprising:
   at least one processor circuit; and
   at least one memory that stores program code configured to be executed by the at least one processor circuit, the program code comprising:
   a phrase representation generator configured to:
      receive a plurality of trigger phrases, each trigger phrase being configured to trigger a bot that receives the trigger phrase to select a corresponding topic for conversation, and
      generate a vector representation for each trigger phrase of the plurality of trigger phrases; and
   an overlap detector configured to:
      generate measures of similarity based at least on the vector representations, each measure of similarity representing a degree of similarity between a respective pair of vector representations;
      detect a topic overlap based on a pair of vector representations having a measure of similarity above a similarity threshold, the topic overlap indicating two trigger phrases that are overlapping; and
      provide the topic overlap to an authoring tool, wherein the authoring tool comprises one or more interactive elements to enable a user to change at least one of the two trigger phrases that are overlapping.

2. The system of claim 1, wherein the bot is configured to identify two topics for conversation when provided with either trigger phrase of the two trigger phrases that are overlapping.

3. The system of claim 2, wherein the authoring tool is configured to receive a change to one of the two trigger phrases that are overlapping, and
   wherein the bot is configured to select a single topic for conversation when provided with the changed trigger phrase.

4. The system of claim 1, wherein each measure of similarity is indicative of a degree of semantic similarity between a first vector representation corresponding to a first trigger phrase and a second vector representation corresponding to a second trigger phrase.

5. The system of claim 1, further comprising:
   a testing interface configured to enable a simulated conversation with the bot, the simulated conversation comprising a conversation to determine whether a trigger phrase provided to the bot causes the bot to identify a plurality of topics for conversation.

6. The system of claim 1, wherein the overlap detector is configured to provide a plurality of topic overlaps to the authoring tool, the plurality of topic overlaps ranked based on measures of similarity corresponding to the plurality of topic overlaps.

7. The system of claim 1, wherein the authoring tool is configured to:
   receive a change to one of the two trigger phrases that are overlapping, and
   wherein the overlap detector is configured to:
      automatically generate an updated measure of similarity based at least on the changed trigger phrase.

8. The system of claim 1, wherein the bot comprises a chat bot configured to simulate human conversation with a user.

9. The system of claim 1, wherein the vector representation comprises an embedding generated by applying a language model to each trigger phrase of the plurality of trigger phrases.

10. A method for detecting overlapping topics in a messaging system, the method comprising:
   receiving a plurality of trigger phrases, each trigger phrase being configured to trigger a bot that receives the trigger phrase to select a corresponding topic for conversation;
   generating a vector representation for each trigger phrase of the plurality of trigger phrases;
   generating measures of similarity based at least on the vector representations, each measure of similarity representing a degree of similarity between a respective pair of vector representations;
   detecting a topic overlap based on a pair of vector representations having a measure of similarity above a similarity threshold, the topic overlap indicating two trigger phrases that are overlapping; and providing the topic overlap to an authoring tool, wherein the authoring tool comprises one or more interactive elements to enable a user to change at least one of the two trigger phrases that are overlapping.

11. The method of claim 10, wherein providing either trigger phrase of the two trigger phrases that are overlapping to the bot causes the bot to identify two topics for conversation.

12. The method of claim 11, further comprising:
receiving a change to one of the two trigger phrases that are overlapping via the authoring tool, wherein providing the changed trigger phrase to the bot causes the bot to select a single topic for conversation.

13. The method of claim 10, wherein each measure of similarity is indicative of a degree of semantic similarity between a first vector representation corresponding to a first trigger phrase and a second vector representation corresponding to a second trigger phrase.

14. The method of claim 10, further comprising:
providing a testing interface that enables a simulated conversation with the bot, the simulated conversation comprising a conversation to determine whether a trigger phrase provided to the bot causes the bot to identify a plurality of topics for conversation.

15. The method of claim 10, further comprising:
providing a plurality of topic overlaps to the authoring tool, the plurality of topic overlaps ranked based on measures of similarity corresponding to the plurality of topic overlaps.

16. The method of claim 10, further comprising:
receiving a change to one of the two trigger phrases that are overlapping; and
automatically generating an updated measure of similarity based at least on the changed trigger phrase.

17. The method of claim 10, wherein the bot comprises a chat bot configured to simulate human conversation with a user.

18. The method of claim 10, wherein the vector representation comprises an embedding generated by applying a language model to each trigger phrase of the plurality of trigger phrases.

19. A computer-readable storage medium having program instructions recorded thereon that, when executed by at least one processor of a computing device, perform a method, the method comprising:
receiving a plurality of trigger phrases, each trigger phrase being configured to trigger a bot that receives the trigger phrase to select a corresponding topic for conversation;
generating a vector representation for each trigger phrase of the plurality of trigger phrases;
generating measures of similarity based at least on the vector representations, each measure of similarity representing a degree of similarity between a respective pair of vector representations;
detecting a topic overlap based on a pair of vector representations having a measure of similarity above a similarity threshold, the topic overlap indicating two trigger phrases that are overlapping; and
providing the topic overlap to an authoring tool, wherein the authoring tool comprises one or more interactive elements to enable a user to change at least one of the two trigger phrases that are overlapping.

20. The computer-readable medium of claim 19, wherein the method further comprises:
receiving a change to one of the two trigger phrases that are overlapping via the authoring tool, wherein providing the changed trigger phrase to the bot causes the bot to select a single topic for conversation.

* * * * *